United States Patent
Jang et al.

(10) Patent No.: US 11,928,858 B2
(45) Date of Patent: Mar. 12, 2024

(54) APPARATUS FOR ESTIMATING CONTACT DISTRIBUTION AND METHOD THEREOF

(71) Applicant: UIF (University Industry Foundation), Yonsei University, Seoul (KR)

(72) Inventors: Yong Hoon Jang, Seoul (KR); Ilkwang Jang, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 204 days.

(21) Appl. No.: 17/553,638

(22) Filed: Dec. 16, 2021

(65) Prior Publication Data

US 2022/0189153 A1    Jun. 16, 2022

(30) Foreign Application Priority Data

Dec. 16, 2020   (KR) .................. 10-2020-0176384

(51) Int. Cl.
| | |
|---|---|
| G06V 10/82 | (2022.01) |
| G06N 3/02 | (2006.01) |
| G06T 9/00 | (2006.01) |
| G06V 10/32 | (2022.01) |
| G06V 10/778 | (2022.01) |
| G06V 10/98 | (2022.01) |

(52) U.S. Cl.
CPC .............. *G06V 10/82* (2022.01); *G06N 3/02* (2013.01); *G06T 3/4046* (2013.01); *G06T 3/4053* (2013.01); *G06T 9/001* (2013.01); *G06V 10/32* (2022.01); *G06V 10/778* (2022.01); *G06V 10/98* (2022.01)

(58) Field of Classification Search
CPC ...... G06V 10/82; G06V 10/32; G06V 10/778; G06V 10/98; G06V 2201/06; G06N 3/02; G06N 3/045; G06N 3/08; G06N 3/04; G06T 3/4046; G06T 3/4053; G06T 9/001
See application file for complete search history.

(56) References Cited

FOREIGN PATENT DOCUMENTS

| JP | H9-166632 A | 6/1997 |
|---|---|---|
| JP | 2005-285353 A | 10/2005 |
| JP | 2018-163871 A | 10/2018 |

OTHER PUBLICATIONS

Solder bump defects, Su et al, Apr. 2019; https://link.springer.com/article/10.1007/s11431-018-9324-3 (Year: 2019).*

(Continued)

*Primary Examiner* — Jianxun Yang
(74) *Attorney, Agent, or Firm* — Park, Kim & Suh, LLC

(57) ABSTRACT

An apparatus for estimating contact distribution to quickly estimate contact spot distribution from a contact surface image using a deep learning model based on a convolution neural network (CNN) and a method thereof are disclosed. A method for estimating contact distribution to estimate contact spot distribution between a first contact spot and a second contact spot includes inputting a contact surface image of at least one of the first contact surface and the second contact surface to a deep learning model based on a CNN and estimating contact spot distribution between the first contact surface and the second contact surface from an output of the deep learning model.

14 Claims, 8 Drawing Sheets

(56) References Cited

OTHER PUBLICATIONS

Deep CNN and ELM, Kolsch et al, 2017; Deep CNN and ELM, Kolsch et al, 2017 (Year: 2017).*
Richard F. Voss, "Fractals in nature: From characterization to simulation", The Science of Fractal Images, Springer-Verlag New York Inc 1988, pp. 21-70.
A. Polonsky and L.M. Keer, "A numerical method for solving rough contact problems based on the multi-level multi-summation and conjugate gradient techniques", Wear, vol. 231, No. 2, 1999, pp. 206-219.
Shahin Salehi, "Machine Learning for Contact Mechanics from Surface topography", Computer Science and Engineering, bachelor's lever 2019, LULEA University of Technology, 29 pages.
Wei Jing Wong, et al., "Multi-task CNN for restoring corrupted fingerprint images", Pattern Recognition 101 (2020) 107203, Retrieved from: https://doi.org/10.1016/j.patcog.2020.107203, 11 pages.
M. Paggi, et al., "Contact conductance of rough surfaces composed of modified RMD patches", International Journal of Heat and Mass Transfer 54 (2011) 4664-4672, doi:10.1016/j.ijheatmasstransfer.2011.06.011, 9 pages.

\* cited by examiner

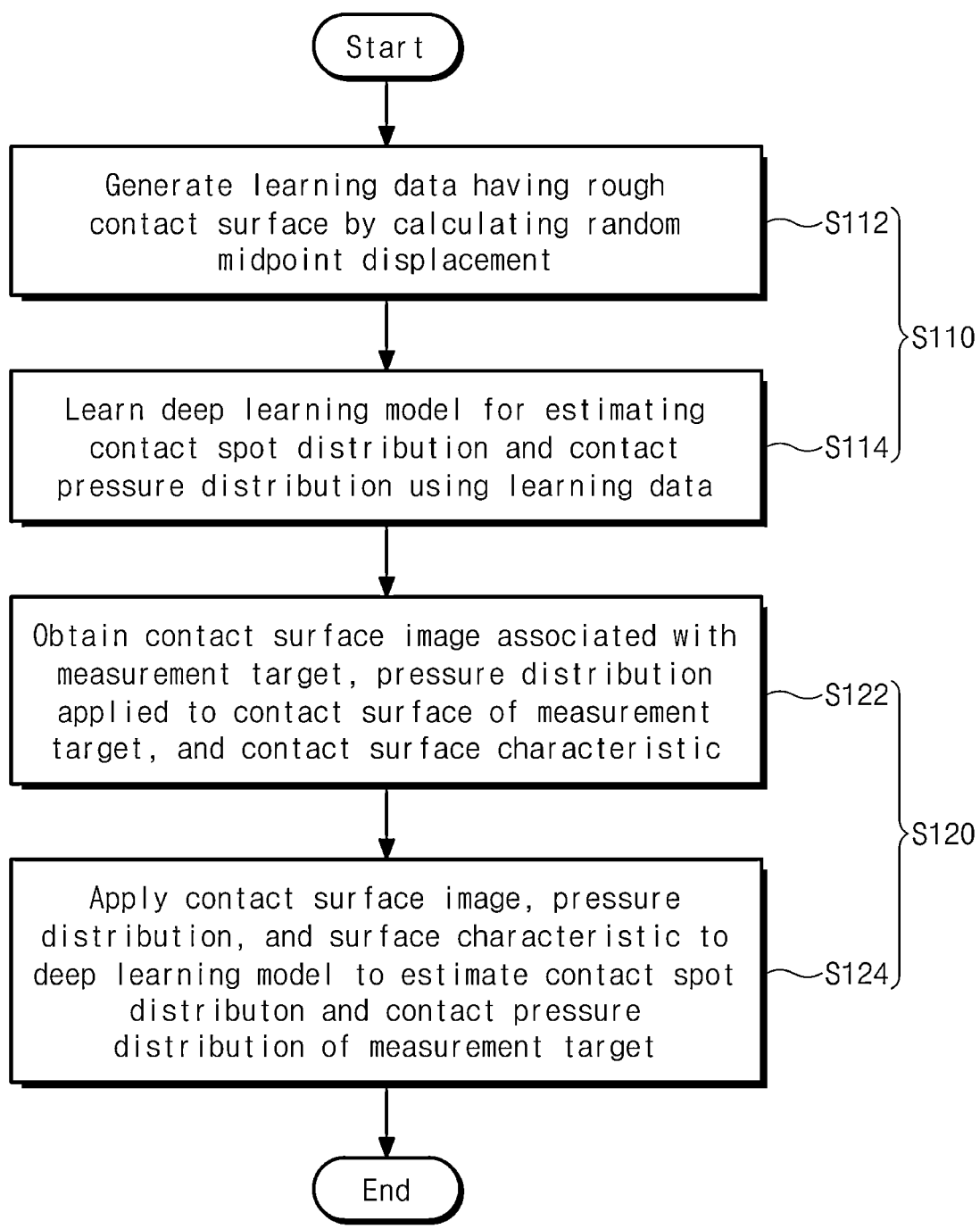

APPARATUS FOR ESTIMATING CONTACT DISTRIBUTION AND METHOD THEREOF

STATEMENT REGARDING GOVERNMENT SPONSORED RESEARCH OR DEVELOPMENT

This work was supported by the National Research Foundation of Korea(NRF) grant funded by the Korea government(MSIT) (No. 2021R1A2C3010731). There is no property interest of the Korean government in any aspect of this invention.

CROSS-REFERENCE TO RELATED APPLICATIONS

This application claims priority under 35 U.S.C. § 119 to Korean Patent Application No. 10-2020-0176384 filed on Dec. 16, 2020, in the Korean Intellectual Property Office, the disclosures of which are incorporated by reference herein in their entireties.

BACKGROUND

Embodiments of the present disclosure described herein relate to an apparatus for estimating contact distribution and a method thereof, and more particularly, relate to an apparatus for estimating contact distribution to quickly estimate contact spot distribution from a contact surface image using a deep learning model based on a convolution neural network (CNN) and a method thereof.

In general, in various devices such as micro-electro mechanical systems (MEMS), resistance spot welding, a battery, and an electrical connector, when a contact surface which has a rough surface having a micro-scale roughness makes a contact with a contact target surface, only contact spots corresponding to a portion of the contact surface actually make a contact with the contact target surface depending on a fine surface shape of the contact surface. The contact spot distribution of the contact surface having such a rough surface may have an influence on various characteristics such as friction, contact resistance, wear, or bond between two contact surfaces. Thus, research has been conducted in a technology for accurately estimating contact spot distribution between two contact surfaces.

For example, there is a need to accurately identify electrical conductance in contact surfaces to accurately measure electrical contact resistance. For example, when current flows between two objects which are in contact with each other, an actual contact region in which current flows due to a micro-scale roughness of the contact surface is formed in only some of all contact surfaces. Thus, the distribution of regions which actually make a contact with each other between two contact surfaces has an influence on electrical contact resistance.

An existing technology uses a numerical analysis method based on contact dynamics to estimate contact spot distribution between two contact surfaces. The existing numerical analysis method based on contact dynamics estimates contact spot distribution of the contact surface based on a process of measuring a shape of a contact surface to generate a 3D solid model, a process of generating a 3D model having a mesh based on the 3D solid model, and the 3D model. However, the existing numerical analysis method based on contact dynamics needs complicated numerical calculation and takes a lot of computation time for simulation.

SUMMARY

Embodiments of the present disclosure provide an apparatus for estimating contact distribution to quickly estimate contact spot distribution from a contact surface image using a deep learning model based on a CNN and a method thereof.

Furthermore, embodiments of the present disclosure provide an apparatus for estimating contact distribution to accurately estimate contact spot distribution of a rough contact surface having a micro-scale roughness which is difficult to be derived by a numerical analysis method based on contact dynamics and a method thereof.

Furthermore, embodiments of the present disclosure provide an apparatus for estimating contact distribution to quickly estimate contact spot distribution and contact pressure distribution by a deep learning model based on a contact surface image and pressure distribution or a surface characteristic and a method thereof.

According to an embodiment, a method for estimating contact distribution may include inputting, by at least one processor, a contact surface image of at least one of the first contact surface and the second contact surface to a deep learning model based on a convolution neural network (CNN) and estimating, by the at least one processor, contact spot distribution between the first contact surface and the second contact surface from an output of the deep learning model.

The estimating of the contact spot distribution may include inputting pressure distribution data applied between the first contact surface and the second contact surface together with the contact surface image to the deep learning model and estimating the contact spot distribution between the first contact surface and the second contact surface and contact pressure distribution between the first contact surface and the second contact surface from the output of the deep learning model.

The deep learning model may include at least one first convolution unit that performs convolution processing of the contact surface image to generate a feature map, at least one pooling unit that pools the feature map generated by performing the convolution processing by the first convolution unit, at least one up-sampling unit that up-samples a feature map pooled by a last pooling unit among the at least one pooling unit, at least one second convolution unit that performs convolution processing of the feature map up-sampled by the up-sampling unit, a softmax unit that performs softmax processing of a feature map generated by performing convolution processing by a last second convolution unit among the at least one second convolution unit, and a concatenate unit that concatenates the softmax-processed feature map with the pressure distribution data and outputs the contact spot distribution and the contact pressure distribution.

The estimating of the contact spot distribution may include inputting a surface characteristic of at least one of the first contact surface and the second contact surface together with the contact surface image to the deep learning model and estimating the contact spot distribution between the first contact surface and the second contact surface from the output of the deep learning model.

The method may further include generating, by a deep learning model generation unit including the at least one processor, the deep learning model. The generating of the deep learning model may include generating, by a learning data generation unit of the deep learning model generation unit, learning data having a rough contact surface of a fractal structure by calculating random midpoint displacement and learning, by a deep learning model learning unit of the deep learning model generation unit, the deep learning model using the learning data. The calculating of the random midpoint displacement may be a scheme of adding a random value generated according to the Gaussian normal distribution to an average of heights corresponding to grid points of the learning data to randomly calculate a height of a new grid point surrounded by the grid points.

The method may further include estimating a characteristic of at least one of friction, electrical contact resistance, thermal contact resistance, wear, bond, and lubrication between the first contact surface and the second contact surface based on the contact spot distribution.

The method may further include obtaining, by a surface measurement unit, a first contact surface image from the first contact surface and obtaining a second contact surface image from the second contact surface. The estimating of the contact spot distribution may include outputting, by the deep learning model, the contact spot distribution based on the first contact surface image and the second contact surface image.

The method may further include obtaining, by a surface measurement unit, a first contact surface image from the first contact surface and obtaining a second contact surface image from the second contact surface and correcting, by the surface measurement unit, the second contact surface image using the first contact surface image to generate the contact surface image. The estimating of the contact spot distribution may include receiving, by the deep learning model, the contact surface image corrected from the second contact surface image and outputting, by the deep learning model, the contact spot distribution.

According to another embodiment, a transitory computer-readable storage medium may store a program for executing the method for estimating the contact distribution.

According to another embodiment, an apparatus for estimating contact distribution may include at least one processor configured to execute a process for calculating the contact spot distribution based on a deep learning model. The deep learning model may be configured to receive a contact surface image of at least one of the first contact surface and the second contact surface and estimates contact spot distribution between the first contact surface and the second contact surface using a CNN based on the contact surface image.

The apparatus may further include a pressure distribution acquisition unit configured to obtain pressure distribution data applied between the first contact surface and the second contact surface. The deep learning model may be configured to receive the pressure distribution data together with the contact surface image and estimate the contact spot distribution between the first contact surface and the second contact surface and contact pressure distribution between the first contact surface and the second contact surface based on the contact surface image and the pressure distribution data.

The apparatus may further include a surface characteristic acquisition unit configured to obtain surface characteristic data of at least one of the first contact surface and the second contact surface. The deep learning model may be configured to receive the surface characteristic data together with the contact surface image and estimate the contact spot distribution between the first contact surface and the second contact surface from an output of the deep learning model.

The at least one processor may include a deep learning model generation unit configured to generate the deep learning model. The deep learning model generation unit may include a learning data generation unit configured to generate learning data having a rough contact surface of a fractal structure by calculating random midpoint displacement and a deep learning model learning unit configured to learn the deep learning model using the learning data.

In an embodiment of the present disclosure, the deep learning model may be configured to output the contact spot distribution based on the first contact surface image and the second contact surface image.

In an embodiment of the present disclosure, the surface measurement unit may be configured to correct the second contact surface image using the first contact surface image to generate the contact surface image. The deep learning model may be configured to receive the contact surface image corrected from the second contact surface image and output the contact spot distribution.

BRIEF DESCRIPTION OF THE FIGURES

The above and other objects and features of the present disclosure will become apparent by describing in detail embodiments thereof with reference to the accompanying drawings.

FIG. 4 is a flowchart of a method for estimating contact distribution according to an embodiment of the present disclosure;

DETAILED DESCRIPTION

Advantages, features, and methods of accomplishing the same will become apparent with reference to embodiments described in detail below together with the accompanying drawings. However, the present disclosure is not limited by embodiments disclosed hereinafter, and may be implemented in various forms. Rather, these embodiments are provided to so that this disclosure will be through and complete and will fully convey the concept of the invention to those skilled in the art, and the present disclosure will only be defined by the appended claims. The same reference denotations refer to the same components throughout the specification.

In the specification, it will be understood that the terms "comprises," "comprising," "includes" and/or "including," when used herein, specify the presence of stated components, but do not preclude the presence or addition of one or more other components. The term '~unit' used in the specification may be a unit of processing at least one function or operation, which may refer to, for example, software, a field programmable gate array (FPGA), or a hardware component. A function provided from the '~unit' may be divided and performed by a plurality of components or may be integrated with other additional components. The '~unit' in the specification are not necessarily limited to software or hardware, which may be configured to be included in an addressable storage medium or to reproduce one or more processors. Hereinafter, an embodiment of the present disclosure will be described in detail with reference to the accompanying drawings.

An apparatus and a method for estimating contact distribution according to an embodiment of the present disclosure may input a contact surface image of a first contact surface and/or a second contact surface to a deep learning model based on a CNN and may estimate contact spot distribution between the first contact surface and the second contact surface from the output of the deep learning model.

An embodiment of the present disclosure may quickly estimate contact spot distribution from a contact surface image using the deep learning model based on the CNN. Furthermore, an embodiment of the present disclosure may quickly estimate contact spot distribution and contact pressure distribution depending on the deep learning model based on pressure distribution and/or a surface characteristic together with the contact surface image.

Figure 1:
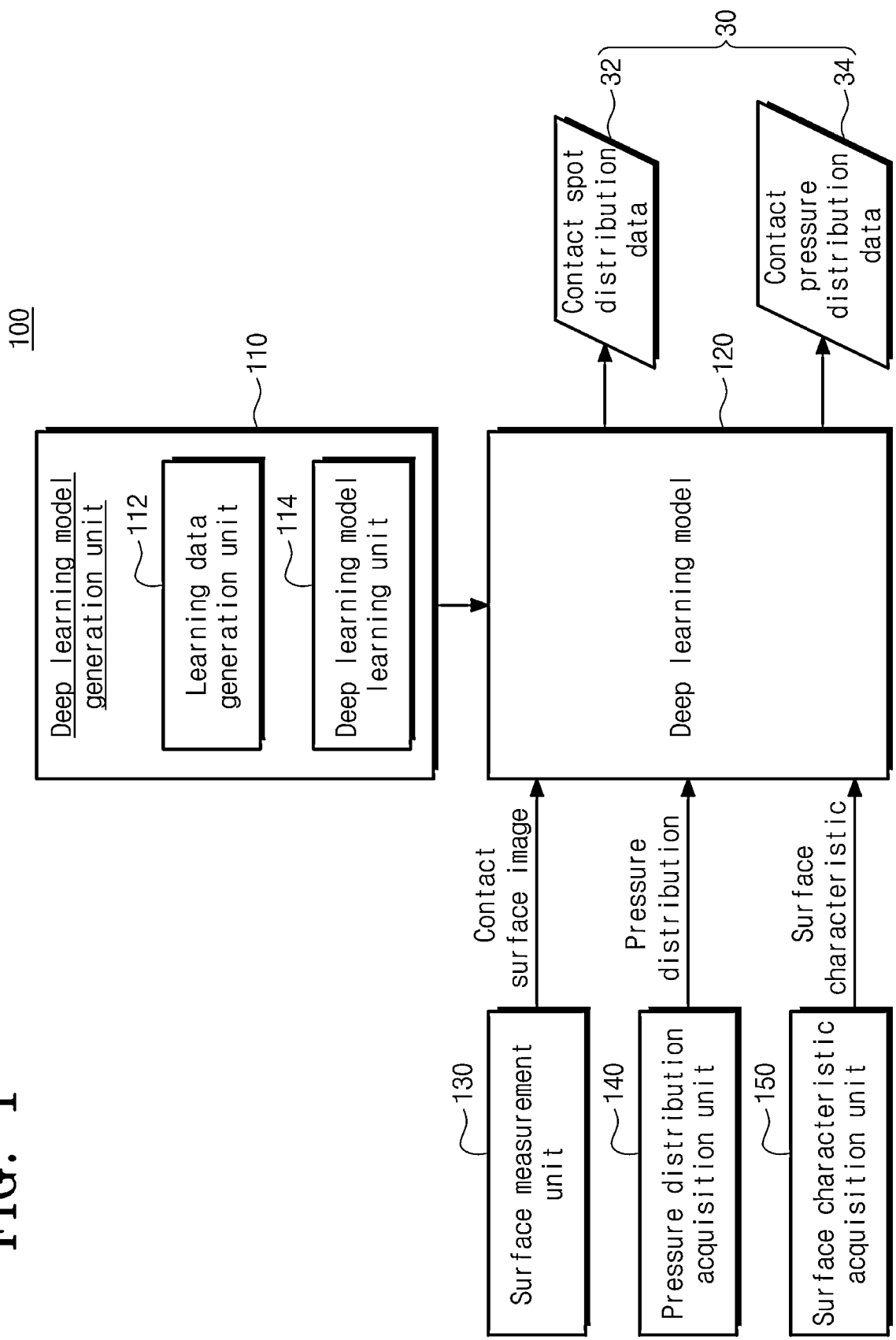
FIG. 1 is a block diagram illustrating a configuration of an apparatus for estimating contact distribution according to an embodiment of the present disclosure.

FIG. 1 is a block diagram illustrating a configuration of an apparatus for estimating contact distribution according to an embodiment of the present disclosure. An apparatus 100 for estimating contact distribution according to an embodiment of the present disclosure may be provided to calculate contact spot distribution between a first contact surface and a second contact surface associated with a measurement target.

Referring to FIG. 1, the apparatus 100 for estimating the contact distribution may include a deep learning model generation unit 110, a deep learning model 120, a surface measurement unit 130, a pressure distribution acquisition unit 140, and a surface characteristic acquisition unit 150.

The deep learning model generation unit 110 may generate a deep learning model 120 for estimating contact spot distribution between the first contact surface and the second contact surface from a contact surface image 10 associated with the measurement target.

The deep learning model 120 may be implemented as a convolution neural network (CNN) for receiving the contact surface image 10 and estimating contact spot distribution between contact surfaces.

The measurement target may be, for example, an object having a contact surface which has a roughness of several to hundreds of micrometers in size (e.g., 1 μm to 1 mm). The measurement target may be, for example, an object having a contact surface such as a conductive contact surface, a friction surface, a wear surface, or a bonding surface.

Figure 2A:
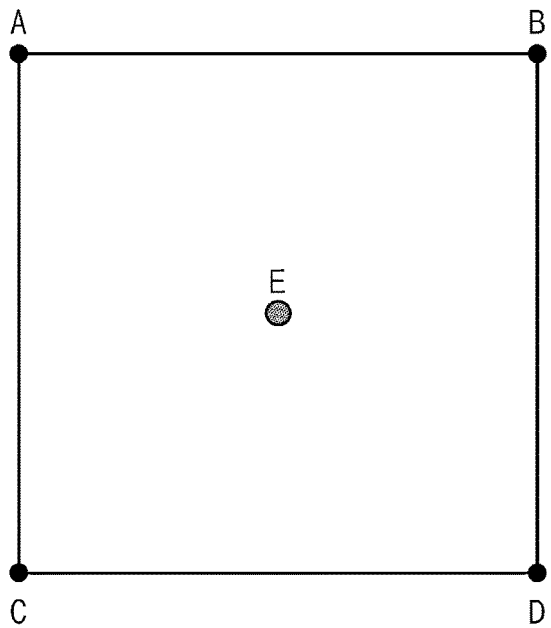
FIGS. 2A and 2B are conceptual diagrams illustrating a method for generating learning data according to an embodiment of the present disclosure.
Figure 2B:
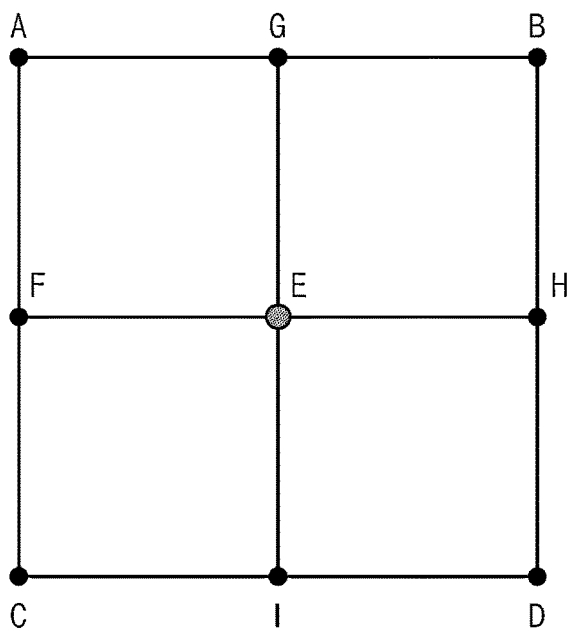

The deep learning model generation unit 110 may include a learning data generation unit 112 and a deep learning model learning unit 114. FIGS. 2A and 2B are conceptual diagrams illustrating a method for generating learning data according to an embodiment of the present disclosure.

Referring to FIGS. 1, 2A, and 2B, a learning data generation unit 112 may generate learning data having a rough contact surface of a fractal structure by calculating random midpoint displacement.

The calculating of the random midpoint displacement may be a scheme of adding a random value generated according to the Gaussian normal distribution to an average of heights corresponding to grid points of learning data to randomly calculate a height of a new grid point surrounded by the grid points.

FIG. 2A is a drawing illustrating a first stage of calculating random midpoint displacement. In the first stage of calculating the random midpoint displacement, a height value of a new grid point E corresponding to the center of grid points A, B, C, and D may be calculated as a value obtained by adding an average height value of the surrounding grid points A, B, C, and D and a random value rand(D) generated according to the Gaussian normal distribution, the average value of which is 0, depending on Equation 1 below.

$$E = \frac{A+B+C+D}{4} + rand(D) \quad \text{[Equation 1]}$$

FIG. 2B is a drawing illustrating a second stage of calculating random midpoint displacement. In the second stage of calculating the random midpoint displacement, a height value of a new grid point G may be calculated as a value obtained by adding an average height value of the surrounding grid points A, B, C, and D and a random value rand(D) generated according to the Gaussian normal distribution, the average value of which is 0, depending on Equation 2 below.

$$G = \frac{A+B+E+E}{4} + rand(D) \quad \text{[Equation 2]}$$

Heights of other new grid points F, H, and I may also be calculated in a similar manner. At this time, a fractal dimension D may be set to a value of 2 to 2.5. The dispersion of the Gaussian normal distribution indicates contact surface roughness of learning data.

A deep learning model learning unit 114 may learn a deep learning model 120 using learning data. The deep learning model 120 may receive a contact surface image of at least one of a first contact surface and a second contact surface and may estimate contact spot distribution between the first contact surface and the second contact surface using the CNN based on the contact surface image.

A surface measurement unit 130 may obtain a first contact surface image from the first contact surface and may obtain a second contact surface image from the second contact surface. The surface measurement unit 130 may include, for example, a three-dimensional (3D) image acquisition device (e.g., a 3D camera, a 3D depth image acquisition device, or the like) for obtaining an image for a contact surface of an object which is a measurement target, a 3D design data acquisition device for collecting design data of the contact surface of the measurement target.

The deep learning model 120 may output contact spot distribution data 32 based on the first contact surface image and/or the second contact surface image. To improve a learning speed, the deep learning model 120 may be implemented as a fully convolutional neural network which does not include a fully connected layer and is configured with only a convolution layer.

In an embodiment, the deep learning model 120 may receive pressure distribution data together with a contact surface image and may output output data 30 including contact spot distribution data 32 between the first contact surface and the second contact surface and contact pressure distribution data 34 between the first contact surface and the second contact surface, based on the contact surface image and the pressure distribution data.

Figure 3:
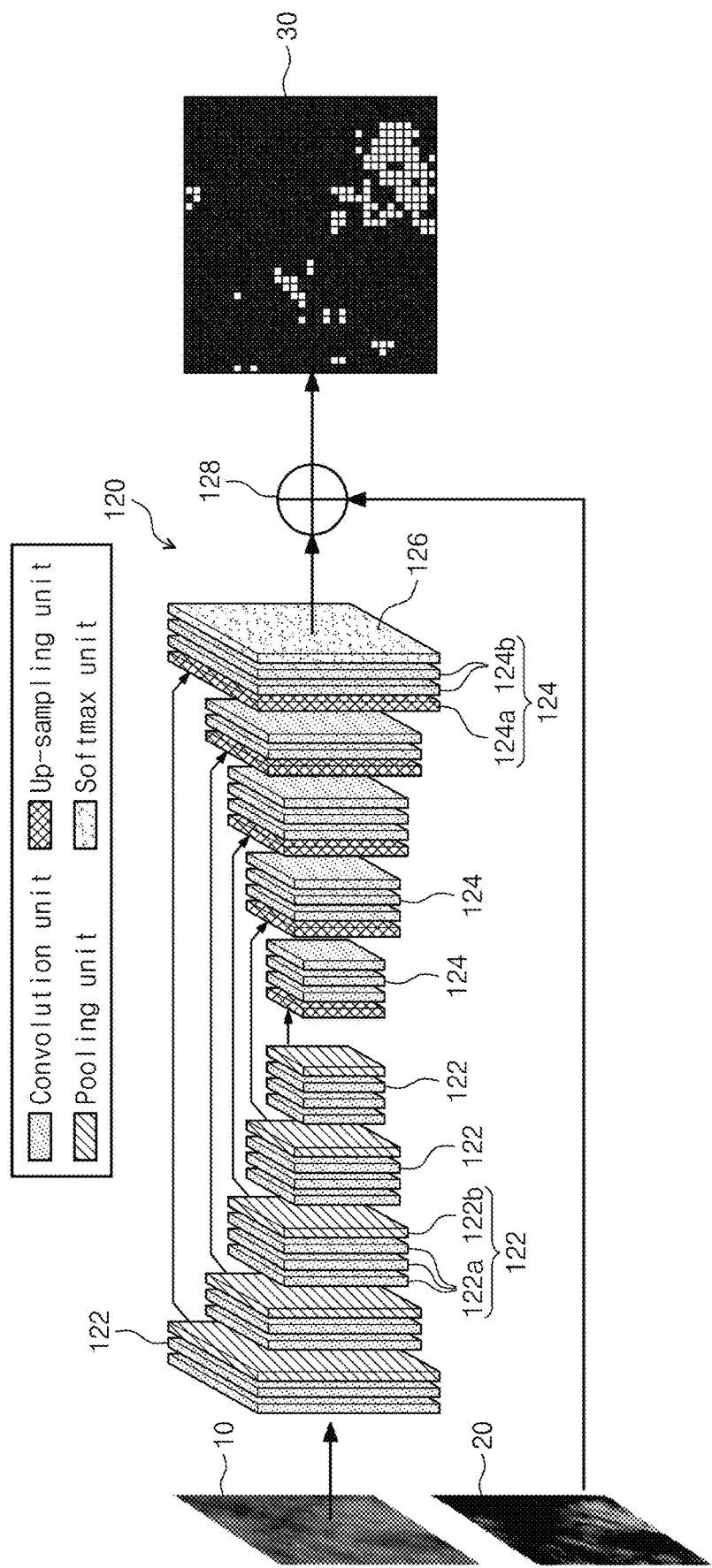
FIG. 3 is a conceptual diagram of a deep learning model making up an apparatus for estimating contact distribution according to an embodiment of the present disclosure.

FIG. 3 is a conceptual diagram of a deep learning model making up an apparatus for estimating contact distribution according to an embodiment of the present disclosure. Referring to FIGS. 1 and 3, a deep learning model 120 may include a plurality of first convolution processing units 122, a plurality of second convolution processing units 124, and a concatenate unit 128.

The first convolution processing unit 122 may include a plurality of first convolution units 122a and a pooling unit 122b.

The first convolution unit 122a may perform convolution processing of a contact surface image 10 once or a plurality of times to generate a feature map.

The first convolution unit 122a may be a convolution layer which performs convolution processing, batch normalization processing, and ReLU processing.

The contact surface image 10 input to the first convolution processing unit 122 may have an L×M×N size (e.g., a 32×32×1 size).

The pooling unit 122b may be a pooling layer which pools the feature map generated by performing the convolution processing by the first convolution unit 122a.

The feature map generated by performing the convolution processing by the ith (where i is an integer of 1 or more) first convolution unit 122a among the plurality of first convolution processing units 122 may be input to the ith pooling unit 122b to be pooled.

The pooling unit 122b may use various pooling methods such as max pooling and average pooling. The feature map pooled by the pooling unit 122b may have a size smaller than the feature map before performing the pooling processing.

The feature map pooled by the ith pooling unit 122b may be input to the (i+1)st first convolution processing unit 122a among the plurality of first convolution processing unit 122 to perform convolution processing again.

As convolution processing and pooling processing are repeated, the contact surface image 10 may be segmented into various feature maps indicating features associated with contact spot distribution.

The second convolution processing unit 124 may include an up-sampling unit 124a, a plurality of second convolution units 124b, and a softmax unit 126.

The up-sampling unit 124a may be an up-sampling layer which up-samples the feature map pooled by a last pooling unit among the at least one pooling unit 122b.

The feature map up-sampled by the up-sampling unit 124a may have a size larger than the feature map before being up-sampled.

The second convolution unit 124b may perform convolution processing of the feature map, which is segmented from the contact surface image 10 and is up-sampled by the up-sampling unit 124a, once or a plurality of times.

The second convolution unit 124b may be a convolution layer which performs convolution processing, batch normalization processing, and ReLU processing.

The feature map up-sampled by the jth (where j is an integer of 1 or more) up-sampling unit 124a among the plurality of second convolution processing units 124 may be input to the jth second convolution processing unit 124b among the plurality of jth second convolution processing units 124 to perform convolution processing.

The feature map pooled by the ith second pooling unit 124b may be input to the (j+1)st up-sampling unit 124a among the plurality of second convolution processing unit 124 to be up-sampled again.

As the up-sampling processing and the convolution processing are repeated, features of the plurality of feature maps segmented from the contact surface image 10 may be added to contact spot distribution data indicating contact spot distribution.

The softmax unit 126 may be a softmax layer which normalizes the feature map generated by performing the convolution processing by a last second convolution unit among the at least one second convolution unit 124b by a softmax activation function.

The first convolution processing unit 122 and the second convolution processing unit 124 may be formed in a symmetrical structure.

The feature map pooled by performing the convolution processing by the kth first convolution processing unit 122 may be delivered to the kth second convolution processing unit 124 from the back among the plurality of second convolution processing units 124, may be added to the feature map generated by performing the convolution processing by the (k+1)st second convolution processing unit 124 from the back, and may perform up-sampling and convolution processing by the kth second convolution processing unit 124.

Thus, because features of feature maps processed by the plurality of first convolution processing units 122 are used in the plurality of second convolution processing units 124, the accuracy of estimating contact distribution by the deep learning model 120 may be more enhanced.

Contact spot distribution data 32 which is output from the second convolution processing unit 124 and is output through the concatenate unit 128 may be provided at the same size as the contact surface image 10.

A pressure distribution acquisition unit 140 may obtain pressure distribution data 20 applied between a first contact surface and a second contact surface. The pressure distribution data 20 may include information about linear or non-linear pressure distribution applied to the contact surface.

The concatenate unit 128 may concatenate the softmax processed feature map with the pressure distribution data 20 and may output output data 30 including the contact spot distribution data 32 and contact pressure distribution data 34.

The concatenate unit 128 may apply a weight corresponding to pressure distribution applied to pixels corresponding to contact spots among pixels of the contact spot distribution data 32, thus outputting pressure distribution data acting on the contact spots.

A feature map output through the last second convolution processing unit 124 may have the same size as the contact surface image 10 and the pressure distribution data 20.

Thus, the feature map output through the last second convolution processing unit 124 may be concatenated with the pressure distribution data 20 on a pixel-by-pixel basis according to a weight for each pixel of the pressure distribution data 20.

At this time, the weight reflected by the concatenate unit 128 may be set to be proportional to pressure distribution for each pixel of the pressure distribution data 20.

For example, when strong pressure is applied to a specific region of the contact surface, contract pressure distribution data 34 indicating larger contact pressure may be output from a portion corresponding to a contact spot in the region.

Furthermore, when the same force is applied to the specific region, the fewer the number of pixels corresponding to the contact spot in the region, the larger the magnitude of pressure (force) applied to the contact spot may be in the contact pressure distribution data 34 than when the number of pixels corresponding to the contact spot is relatively large.

Furthermore, when pressure is applied to the specific region having elasticity in the contact surface, a portion corresponding to the contact spot in the region may be deformed by pressure and contact spot distribution may be changed. Pressure distribution of the contact pressure distribution data 34 may be changed according to surface characteristic distribution of the contact surface.

When any one of the first contact surface and the second contact surface is a flat surface of less than a set reference roughness, the deep learning model 120 may output the output data 30 including the contact spot distribution data 32 between the first contact surface and the second contact surface from a contact surface image obtained for the other contact surface.

A surface characteristic acquisition unit 150 may obtain surface characteristic data of at least one of the first contact surface and the second contact surface. The surface characteristic data may include, for example, surface characteristic information such as a material (substance), a degree of elasticity (coefficient of elasticity), or hardness, for each contact surface region of a measurement target.

The surface characteristic acquisition unit 150 may read surface characteristic data, such as material distribution, elasticity distribution, or hardness distribution of the contact surface, which is previously stored, from a memory and may input the surface characteristic data to the deep learning model 120.

In an embodiment, the deep learning model 120 may receive the surface characteristic data together with the contact surface image and may output the contact spot distribution data 32 by the CNN to estimate contact spot distribution between the first contact surface and the second contact surface.

For example, the deep learning model 120 may output contact distribution data indicating a wider contact region for a surface region where the degree of elasticity is high (the surface region where the coefficient of elasticity is low) than a surface region where the degree of elasticity is low. Conversely, the deep learning model 120 may output contact distribution data indicating a relatively narrow contact region.

In an embodiment of the present disclosure, a surface measurement unit 130 may correct a second contact surface image obtained from the second contact surface using the first contact surface image obtained from the first contact surface to generate a contact surface image. The deep learning model 120 may receive the contact surface image corrected from the second contact surface image and may output contact spot distribution.

As an example, the method for correcting the second contact surface image to generate the contact surface image may be performed based on a height difference value for each pixel between corresponding pixels between the first contact surface image and the second contact surface image.

In other words, the contact surface image obtained by calculating a difference between heights of two pixels which are in contact with each other between the first and second contact surface images on a pixel-by-pixel basis may be input to the deep learning model 120 to estimate contact spot distribution.

The estimated contact spot distribution may be used to estimate various contact surface characteristics, such as friction, electrical contact resistance, thermal contact resistance, wear, bond, or lubrication, according to an application field.

Data for surface roughness distribution is needed to evaluate a contact area. The surface roughness distribution varies in accuracy of result with resolution of measurement equipment. Various surface roughness distribution from a large scale to a nano-scale may be obtained by an effort to improve the resolution of measuring equipment.

A surface structure and contact area distribution according to it may be changed according to a contact surface measurement scale $\frac{1}{2^n}$ (where n is a measurement scaling exponent). Convergence of the expected contact area distribution may be ensured as approaching a small scale depending on the result of analytically analyzing the contact area using such a fine surface roughness distribution. For example, the contact area size converges while decreasing depending on the contact surface measurement scale $\frac{1}{2^n}$, and electrical contact resistance according to it converges while gradually increasing.

Such multi-scale contact analysis may be an alternative to obtain a more accurate contact area. However, to use such technologies, a surface structure should be obtained according to several scales (resolution). An analysis time required to obtain a contact area using the surface structures increases exponentially as the scale changes. For example, a surface structure (surface roughness) of a very small scale needs more data than a surface structure of a large scale, and a numerical analysis model of a small scale reflecting it requires more memories and faster calculation speed.

An embodiment of the present disclosure which obtains the contact area using the deep learning algorithm may be a method capable of addressing such a multi-scale program. In other words, according to an embodiment of the present disclosure, faster analysis result may be obtained in conjunction with the multi-scale contact analysis method. Furthermore, a technology capable of accurately obtaining a contact area beyond the limit of measurement equipment may be provided.

FIG. 4 is a flowchart of a method for estimating contact distribution according to an embodiment of the present disclosure. Referring to FIGS. 1 and 4, in the method for estimating the contact distribution according to an embodiment of the present disclosure, in S110, a deep learning model generation unit 110 may generate a deep learning model 120 for estimating contact spot distribution between a first contact surface and a second contact surface from a contact surface image 10 associated with a measurement target.

Referring to FIGS. 1, 2A, 2B, and 4, in S112, a learning data generation unit 112 may generate learning data having a rough contact surface of a fractal structure by calculating random midpoint displacement depending on Equations 1 and 2 above.

Figure 5A:
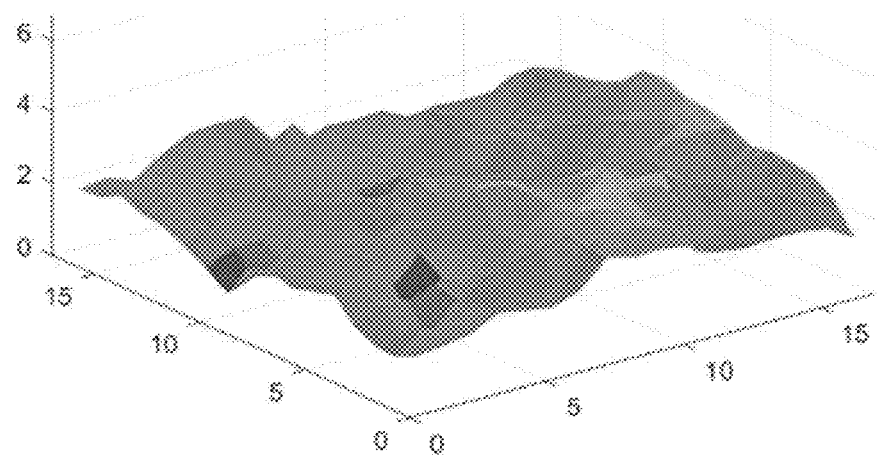
FIG. 5A is a drawing illustrating a random surface generated using 25×25 mesh resolution.
Figure 5B:
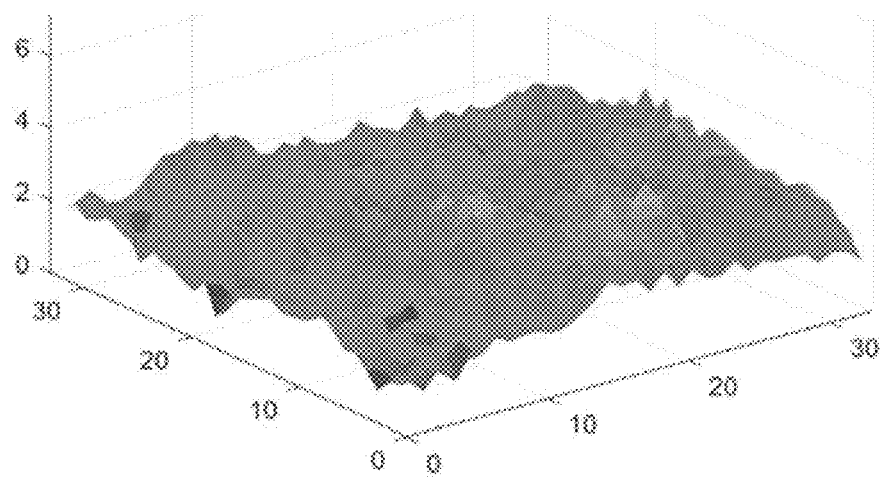
FIG. 5B is a drawing illustrating a rough surface generated by applying a first stage of calculating random midpoint displacement to a random surface of FIG. 5A.
Figure 5C:
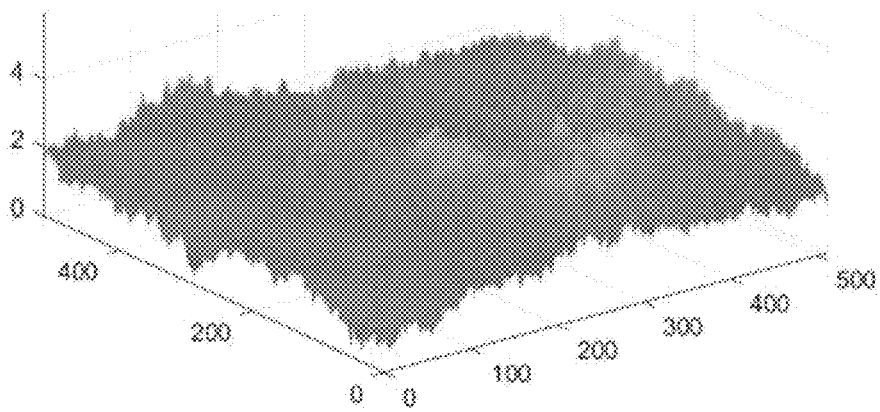
FIG. 5C is a drawing illustrating learning data generated by applying a second stage of calculating random midpoint displacement to a rough surface of FIG. 5B.

FIGS. 5A to 5C are drawings illustrating learning data generated by calculating random midpoint displacement according to an embodiment of the present disclosure. In FIGS. 5A to 5C, two axes on the horizontal plane indicate horizontal and vertical displacements of a contact surface, and a unit thereof is µm. Furthermore, a vertical axis perpendicular to the two axes on the horizontal plane indicates height distribution of the contact surface, and a unit thereof is µm.

Referring to FIGS. 5A to 5C, it may be seen that an area (a horizontal and vertical displacement magnitude) of the contact surface increases by means of repetition of the process of calculating random midpoint displacement. As a result, it may be seen that it is able to learn a deep learning model by ensuring sufficient learning data.

FIG. 5A is a drawing illustrating a random surface generated using 25×25 mesh resolution. FIG. 5B is a drawing illustrating a rough surface generated by applying a first stage of calculating random midpoint displacement to a random surface of FIG. 5A. FIG. 5C is a drawing illustrating learning data generated by applying a second stage of calculating random midpoint displacement to a rough surface of FIG. 5B.

According to an embodiment of the present disclosure, a deep learning model learning unit 114 may generate learning data of a fractal structure by calculating random midpoint displacement and may learn the deep learning model 120 using sufficient learning data.

In S114, the deep learning model learning unit 114 may learn the deep learning model 120 using the learning data. Actual contact distribution data associated with the learning data may be obtained by applying a numerical analysis technique of a multi-level multi-summation (MLMS) method proposed by Polonsky.

In S120, the deep learning model 120 may receive a contact surface image of at least one of a first contact surface and a second contact surface and may estimate contact spot distribution between the first contact surface and the second contact surface using a CNN based on the contact surface image.

To this end, in S122, a surface measurement unit 130 may obtain a first contact surface image from the first contact surface and may obtain a second contact surface image from the second contact surface.

Furthermore, in S122, a pressure distribution acquisition unit 140 may obtain pressure distribution data applied between the first contact surface and the second contact surface.

Furthermore, in S122, a surface characteristic acquisition unit 150 may obtain surface characteristic data of at least one of the first contact surface and the second contact surface.

The deep learning model 120 may output contact spot distribution data 32 based on the first contact surface image and/or the second contact surface image.

In an embodiment, in S124, the deep learning model 120 may receive pressure distribution data together with a contact surface image and may output output data 30 including contact spot distribution data 32 between the first contact surface and the second contact surface and contact pressure distribution data 34 between the first contact surface and the second contact surface, based on the contact surface image and the pressure distribution data.

In an embodiment, the deep learning model 120 may receive the surface characteristic data together with the contact surface image and may output the contact spot distribution data 32 by the CNN to estimate contact spot distribution between the first contact surface and the second contact surface.

In an embodiment of the present disclosure, the surface measurement unit 130 may correct the second contact surface image using the first contact surface image to generate a contact surface image. The deep learning model 120 may receive the contact surface image corrected from the second contact surface image and may output contact spot distribution.

Figure 6A:
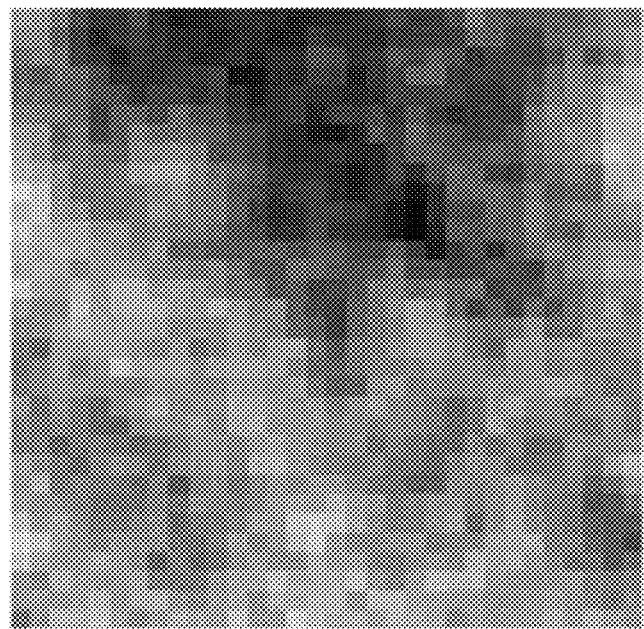
FIG. 6A is a drawing illustrating estimated contact distribution data according to an embodiment of the present disclosure.
Figure 6B:
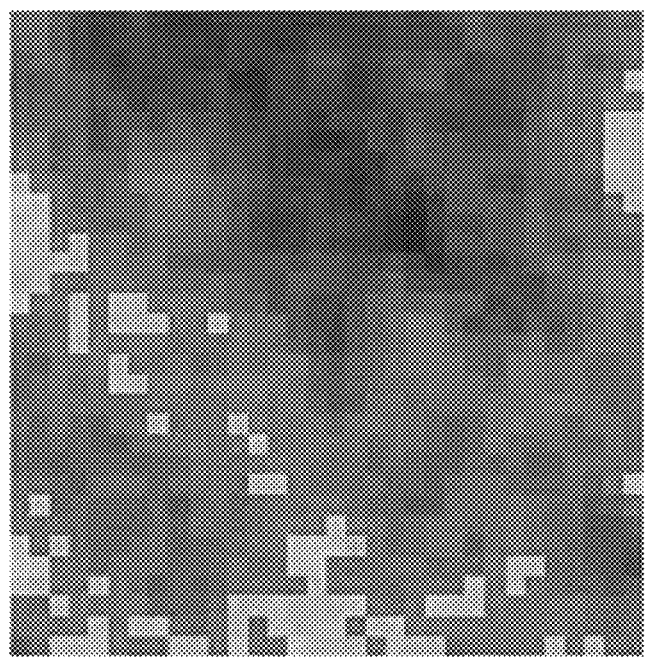
FIG. 6B is a drawing illustrating contact distribution data calculated by a multi-level multi-summation (MLMS) algorithm.
Figure 7:
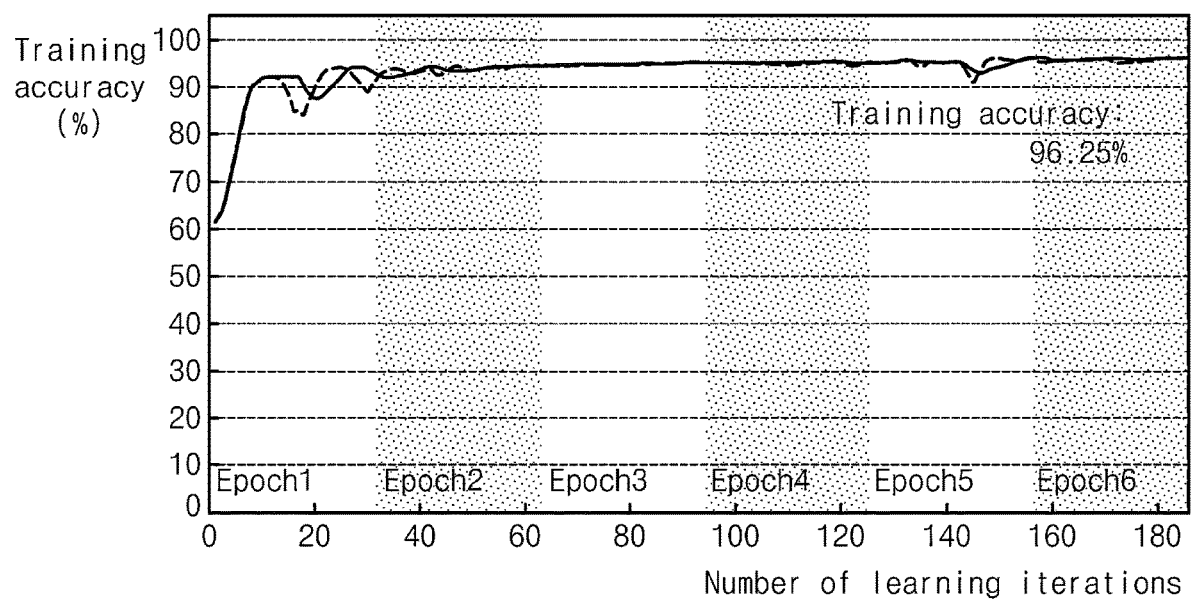
FIG. 7 is a drawing illustrating learning accuracy of a deep learning model learned using learning data generated by calculating random midpoint displacement.

FIG. 6A is a drawing illustrating estimated contact distribution data according to an embodiment of the present disclosure. FIG. 6B is a drawing illustrating contact distribution data calculated by a multi-level multi-summation (MLMS) algorithm. FIG. 7 is a drawing illustrating learning accuracy of a deep learning model learned using learning data generated by calculating random midpoint displacement.

In FIG. 6B, pixels corresponding to contact spots estimated by a CNN and pixels rather than the contact spot are illustrated in different shades.

As shown in FIG. 7, according an embodiment of the present disclosure, contact distribution data estimated based on a deep learning model learned using 4,000 sets of learning data are measured as indicating high training accuracy of 95% or more.

Figure 8:
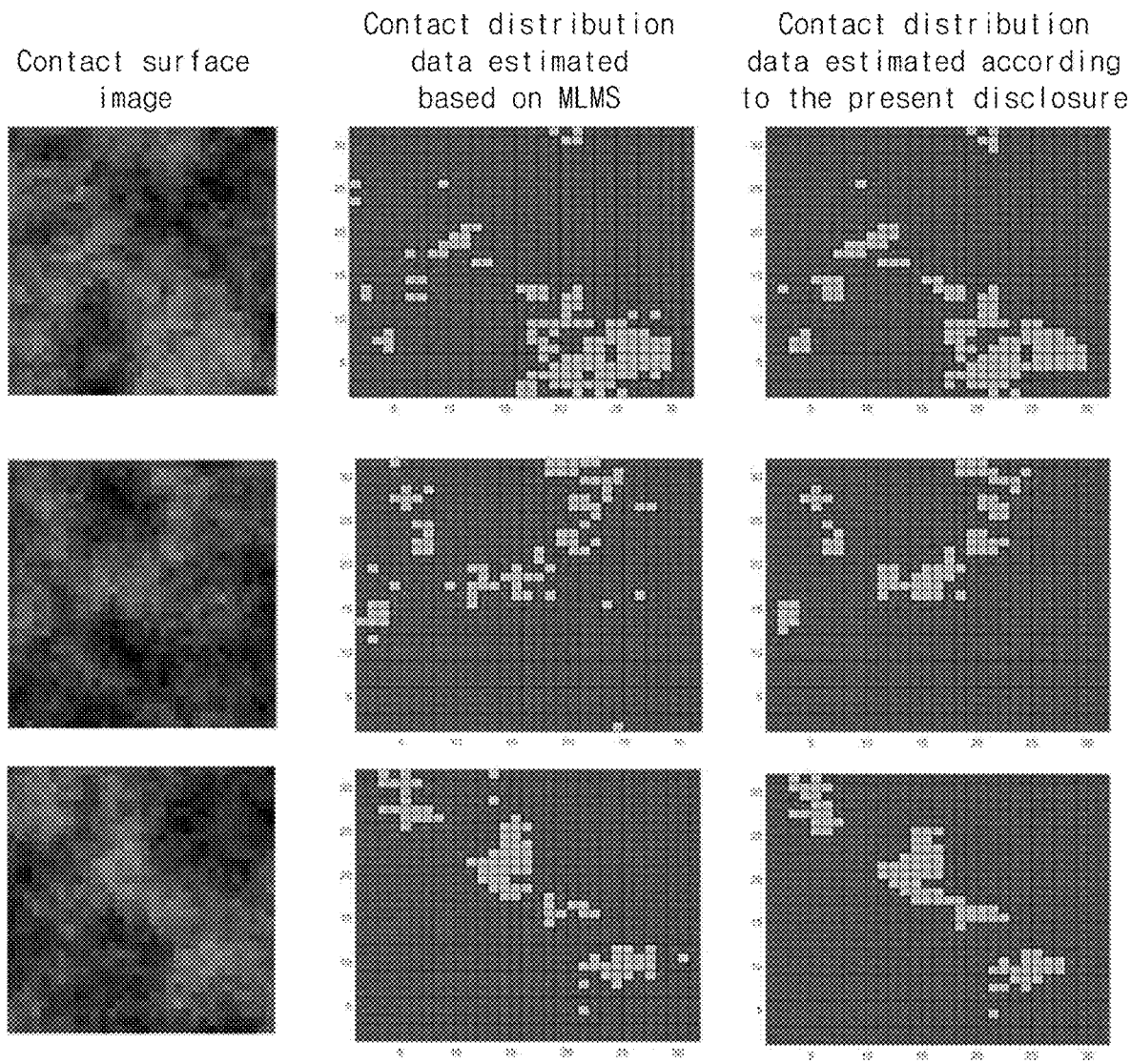
FIG. 8 is a drawing illustrating comparing contact distribution data estimated according to an embodiment of the present disclosure with contact distribution data calculated by an MLMS algorithm from three contact surface images and representing the compared results.

FIG. 8 is a drawing illustrating comparing contact distribution data estimated according to an embodiment of the present disclosure with contact distribution data calculated by an MLMS algorithm from three contact surface images and representing the compared results.

In FIG. 8, pixels corresponding to contact spots estimated by a CNN according to an embodiment of the present disclosure is illustrated in a first shade and pixels rather than the contact spot are illustrated in a second shade different from the first shade.

As shown in FIG. 8, the contact distribution data estimated according to an embodiment of the present disclosure is output in a nearly similar pattern to the contact distribution data calculated by the MLMS algorithm.

The contact distribution data estimated according to an embodiment of the present disclosure indicates mean accuracy of 97.48%, precision of 62.18%, recall of 95.21%, intersection of union (IoU) of 89.80%, and an accuracy value of 99.06%. Definitions of the mean accuracy, the precision, the recall, and the IoU are shown in Table 1 below and Equations 3 to 6 below.

TABLE 1

| TRUE | Predicted | |
|---|---|---|
| | Contact | NonContact |
| Contact | TP | FN |
| NonContact | FP | TN |

$$\text{Accuracy} = \frac{TP + TN}{\text{Total } N_{pixel}} \times 100(\%) \quad \text{[Equation 3]}$$

$$\text{Precision} = \frac{TP}{TP + FP} \times 100(\%) \quad \text{[Equation 4]}$$

$$\text{Recall} = \frac{TP}{TP + FN} \times 100(\%) \quad \text{[Equation 5]}$$

$$IoU = \frac{\text{target} \cap \text{prediction}}{\text{target} \cup \text{prediction}} \times 100(\%) \quad \text{[Equation 6]}$$

$$\left(1 - \left|\frac{ECR_{orignal} - ECR_{estimated}}{ECR_{orignal}}\right|\right) \times 100(\%) \quad \text{[Equation 7]}$$

In Equations 3 to 7 above, 'Total Npixel' denotes the number of all pixels of the estimated contact distribution data, 'target' denotes the pixel corresponding to the contact spot estimated by the MLMS algorithm, 'prediction' denotes the pixel corresponding to the contact spot estimated according to the present disclosure, 'ECRorignal' denotes the original error correction reaction, and 'ECRestimated' denotes the estimated error correction reaction.

As described above, an embodiment of the present disclosure may quickly and accurately estimate the contact spot distribution from the contact surface image using the deep learning model based on the CNN.

Thus, an embodiment of the present disclosure may estimate contact spot distribution of a rough contact surface having a micro-scale roughness, which is difficult to be derived by an existing numerical analysis method based on contact dynamics, at high accuracy and may greatly reduce a calculation time for estimating contact spot distribution.

According to an embodiment of the present disclosure, the apparatus for estimating the contact distribution and the method thereof are provided to quickly estimate contact spot distribution from a contact surface image using a deep learning model based on a CNN.

Furthermore, according to an embodiment of the present disclosure, the apparatus for estimating the contact distribution and the method thereof are provided to accurately estimate contact spot distribution of a rough contact surface having a micro-scale roughness which is difficult to be derived by a numerical analysis method based on contact dynamics.

Furthermore, according to an embodiment of the present disclosure, the apparatus for estimating the contact distribution and the method thereof are provided to quickly estimate contact spot distribution and contact pressure distribution by a deep learning model based on a contact surface image and pressure distribution or a surface characteristic.

While a few embodiments have been shown and described with reference to the accompanying drawings, it will be apparent to those skilled in the art that various modifications and variations can be made from the foregoing descriptions. For example, adequate results may be achieved even if the foregoing processes and methods are carried out in different order than described above, and/or the aforementioned components, such as systems, structures, devices, or circuits, are combined or coupled in different forms and modes than as described above or be substituted or switched with other components or equivalents. Therefore, other implements, other embodiments, and equivalents to claims are within the scope of the following claims.

What is claimed is:

1. A method for estimating contact distribution to estimate contact spot distribution between a first contact surface and a second contact surface, the method comprising:
   estimating, by at least one processor, contact spot distribution between the first contact surface and the second contact surface from an output of a deep learning model based on a convolution neural network, by inputting a contact surface image of at least one of the first contact surface and the second contact surface to the deep learning model; and
   obtaining, by a surface measurement unit, a first contact surface image from the first contact surface and obtaining a second contact surface image from the second contact surface,
   wherein the estimating of the contact spot distribution includes:
   outputting, by the deep learning model, the contact spot distribution based on the first contact surface image and the second contact surface image.

2. The method of claim 1, wherein the estimating of the contact spot distribution further includes:
   inputting pressure distribution data applied between the first contact surface and the second contact surface together with the contact surface image to the deep learning model, to estimate the contact spot distribution between the first contact surface and the second contact surface and contact pressure distribution between the first contact surface and the second contact surface from the output of the deep learning model.

3. The method of claim 2, wherein the deep learning model includes:
   at least one first convolution unit configured to perform convolution processing of the contact surface image to generate a feature map;
   at least one pooling unit configured to pool the feature map generated by performing the convolution processing by the first convolution unit;
   at least one up-sampling unit configured to up-sample a feature map pooled by a last pooling unit among the at least one pooling unit;
   at least one second convolution unit configured to perform convolution processing of the feature map up-sampled by the up-sampling unit;
   a softmax unit configured to perform softmax processing of a feature map generated by performing convolution processing by a last second convolution unit among the at least one second convolution unit; and
   a concatenate unit configured to concatenate the softmax-processed feature map with the pressure distribution data and output the contact spot distribution and the contact pressure distribution.

4. The method of claim 1, wherein the estimating of the contact spot distribution further includes:
   inputting a surface characteristic of at least one of the first contact surface and the second contact surface together with the contact surface image to the deep learning model to estimate the contact spot distribution between the first contact surface and the second contact surface from the output of the deep learning model.

5. The method of claim 1, further comprising:
   generating, by a deep learning model generation unit including the at least one processor, the deep learning model,
   wherein the generating of the deep learning model includes:
   generating, by a learning data generation unit of the deep learning model generation unit, learning data having a rough contact surface of a fractal structure by calculating random midpoint displacement; and
   learning, by a deep learning model learning unit of the deep learning model generation unit, the deep learning model using the learning data, and
   wherein the calculating of the random midpoint displacement is a scheme of adding a random value generated according to the Gaussian normal distribution to an average of heights corresponding to grid points of the learning data to randomly calculate a height of a new grid point surrounded by the grid points.

6. The method of claim 1, further comprising:
   estimating a characteristic of at least one of friction, electrical contact resistance, thermal contact resistance, wear, bond, and lubrication between the first contact surface and the second contact surface based on the contact spot distribution.

7. The method of claim 1, further comprising:
correcting, by the surface measurement unit, the second contact surface image using the first contact surface image to generate the contact surface image,
wherein the estimating of the contact spot distribution further includes:
receiving, by the deep learning model, the contact surface image corrected from the second contact surface image and outputting, by the deep learning model, the contact spot distribution.

8. A non-transitory computer-readable storage medium storing a program for executing a method for estimating contact distribution to estimate contact spot distribution between a first contact surface and a second contact surface, the method comprising:
estimating, by at least one processor, contact spot distribution between the first contact surface and the second contact surface from an output of a deep learning model based on a convolution neural network, by inputting a contact surface image of at least one of the first contact surface and the second contact surface to the deep learning model; and
obtaining, by a surface measurement unit, a first contact surface image from the first contact surface and obtaining a second contact surface image from the second contact surface,
wherein the estimating of the contact spot distribution includes:
outputting, by the deep learning model, the contact spot distribution based on the first contact surface image and the second contact surface image.

9. An apparatus for estimating contact distribution to estimate contact spot distribution between a first contact surface and a second contact surface, the apparatus comprising:
at least one processor configured to execute a process for calculating the contact spot distribution based on a deep learning model,
wherein the deep learning model is configured to:
receive a contact surface image of at least one of the first contact surface and the second contact surface and estimate contact spot distribution between the first contact surface and the second contact surface using a convolution neural network based on the contact surface image,
wherein the at least one processor includes a surface measurement unit configured to obtain a first contact surface image from the first contact surface and obtain a second contact surface image from the second contact surface,
wherein the deep learning model is configured to output the contact spot distribution based on the first contact surface image and the second contact surface image.

10. The apparatus of claim 9, further comprising:
a pressure distribution acquisition unit configured to obtain pressure distribution data applied between the first contact surface and the second contact surface,
wherein the deep learning model is further configured to:
receive the pressure distribution data together with the contact surface image and estimate the contact spot distribution between the first contact surface and the second contact surface and contact pressure distribution between the first contact surface and the second contact surface based on the contact surface image and the pressure distribution data.

11. The apparatus of claim 10, wherein the deep learning model includes:
at least one first convolution unit configured to perform convolution processing of the contact surface image to generate a feature map;
at least one pooling unit configured to pool the feature map generated by performing the convolution processing by the first convolution unit;
at least one up-sampling unit configured to up-sample a feature map pooled by a last pooling unit among the at least one pooling unit;
at least one second convolution unit configured to perform convolution processing of the feature map up-sampled by the up-sampling unit;
a softmax unit configured to perform softmax processing of a feature map generated by performing convolution processing by a last second convolution unit among the at least one second convolution unit; and
a concatenate unit configured to concatenate the softmax-processed feature map with the pressure distribution data and output the contact spot distribution and the contact pressure distribution.

12. The apparatus of claim 9, further comprising:
a surface characteristic acquisition unit configured to obtain surface characteristic data of at least one of the first contact surface and the second contact surface,
wherein the deep learning model is further configured to:
receive the surface characteristic data together with the contact surface image and estimate the contact spot distribution between the first contact surface and the second contact surface from an output of the deep learning model.

13. The apparatus of claim 9, wherein the at least one processor includes a deep learning model generation unit configured to generate the deep learning model,
wherein the deep learning model generation unit includes:
a learning data generation unit configured to generate learning data having a rough contact surface of a fractal structure by calculating random midpoint displacement; and
a deep learning model learning unit configured to learn the deep learning model using the learning data, and
wherein the calculating of the random midpoint displacement is a scheme of adding a random value generated according to the Gaussian normal distribution to an average of heights corresponding to grid points of the learning data to randomly calculate a height of a new grid point surrounded by the grid points.

14. The apparatus of claim 9,
wherein the surface measurement unit is further configured to correct the second contact surface image using the first contact surface image to generate the contact surface image, and
wherein the deep learning model is further configured to receive the contact surface image corrected from the second contact surface image and output the contact spot distribution.

* * * * *